Feb. 16, 1932.    J. G. ANTOSH, JR    1,845,013
BUMPER BARB
Filed June 13, 1931

Inventor:
John G. Antosh Jr.
By Milo B. Stewart
Attys.

Patented Feb. 16, 1932

1,845,013

UNITED STATES PATENT OFFICE

JOHN G. ANTOSH, JR., OF CHICAGO, ILLINOIS

BUMPER BARB

Application filed June 13, 1931. Serial No. 544,251.

My invention relates to automobile bumpers and more particularly to developments thereof for discouraging the unauthorized riding thereof by vagrants or loiterers, and my object is to provide a series of barbs easily attachable to the conventional bumper to accomplish the purpose aforesaid.

With the above object in view and any others that may suggest themselves from the specification and claims to follow, a better understanding of the invention may be had by reference to the accompanying drawings, in which—

Figure 3:
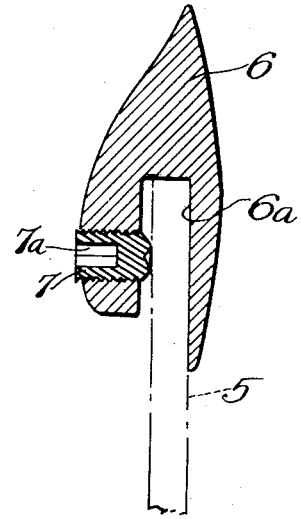
Fig. 3 is a section on the line 3—3 of Figure 2.

The conventional automobile bumper usually consists of a single bar 5, as shown in the drawings, or of two or three bars arranged in vertically spaced relation. A bar of this type is usually of steel stock about one-quarter inch thick. My intention is to mount the single bar, or the top bar of a multiple type, with a series of barbs 6 of substantially diamond formation, as clearly shown in Figure 3. Each of the barbs 6 is a casting of substantial thickness, and which is slotted at 6a from below to straddle the bumper bar 5 when mounted upon the same, as clearly shown in Figure 3. The rear side of the barb is built in relief to provide sufficient body and also present a rounded appearance; and the frontal side, made sufficiently thick and horizontally tapped to receive a set screw 7 adapted to be advanced against the bumper bar to firmly secure the barb to the same. While the set screw may have the usual nick for a screw driver I prefer to use an angular cavity 7a instead, to receive a key wrench when the screw is to be turned. This expedient makes it possible to drive the screw more tightly and prevents the unauthorized removal of the barb by the use of a screw driver or knife. The barb is made with slightly rounded corners and nickeled to appear as an ornament to the bumper.

Figure 1:
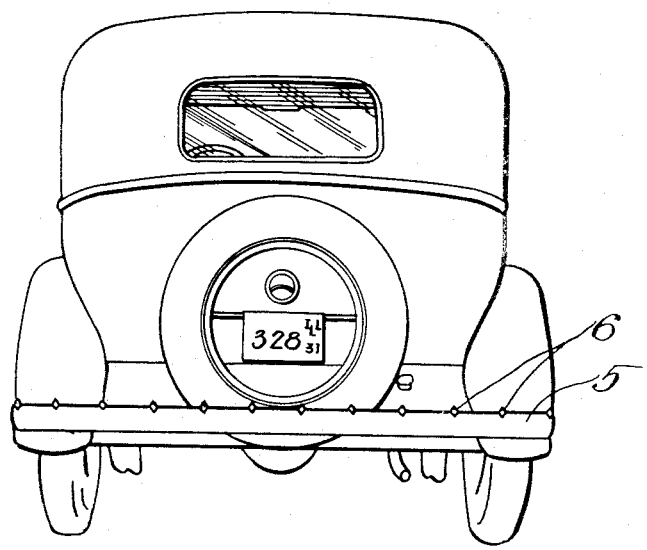
Figure 1 is a rear view of an automobile equipped with the conventional bumper and showing the application of the invention.
Figure 2:
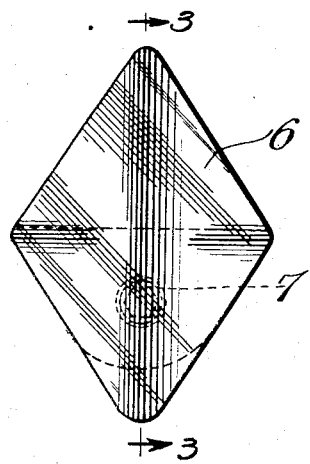
Fig. 2 is an enlarged rear elevation of the novel barb.

With a series of the novel barbs applied to a bumper as indicated in Figure 1, it will be apparent that few if any vagrants or loiterers would attempt to ride the bumper for fear of bodily injury by the barbs. Yet, these are not so sharp or prominent as to injure persons or objects by ordinary contact or to form an impediment when parking the car or backing it into the bumper of another car. Finally, the device is of exceeding simplicity, may be produced at low cost and may be applied or replaced without any particular skill.

I claim:—

1. A protective barb for automobile bumpers comprising a pointed member mountable upon the bumper and divided from front to rear to receive the bumper therebetween, one of the divided portions being tapped with a transverse bore, and a screw threaded through said bore toward the bumper whereby to secure the member to the same.

2. The structure of claim 1, said screw being angularly recessed in its outer end for the application of a key wrench.

3. A barb attachment for automobile bumpers comprising a solid metal member recessed from below to straddle the bumper, the form of the member being substantially that of a diamond.

In testimony whereof I affix my signature.

JOHN G. ANTOSH, JR.